Patented Dec. 1, 1942

2,304,001

UNITED STATES PATENT OFFICE 2,304,001

COMPOSITION OF MATTER USEFUL IN MAKING PRINT ROLLS AND THE LIKE

Joseph H. Kugler and William A. Vievering, St. Paul, Minn., assignors to Minnesota Mining & Manufacturing Company, St. Paul, Minn., a corporation of Delaware No Drawing. Application May 6, 1939, Serial No. 272,293

20 Claims. (Cl. 106—136)

This invention relates to new and improved compositions for use in making printers' roll or inking rollers, or for kindred purposes. It especially concerns compositions possessing advantages over materials heretofore used for such purposes.

Heretofore the classes of printers' rollers which have been used include so-called gelatine rolls and synthetic or natural rubber rolls. Gelatine rolls, which are normally made of glue and glycerine compositions, have been used for finer printing where the roll does not come into contact with water. They have also been used for color printing, and especially for high quality color printing. Rubber rolls, while they will not do as fine work, are tolerable for coarse work such as printing newspapers, handbills, etc., where the inks used do not contain rubber solvents.

While glue-glycerine rolls are resistant to many chemicals or solvents used in inks, they have a number of disadvantages. One of the main disadvantages is that at high speeds and/or on hot days, glue-glycerine rolls will melt and, obviously, stop the printing operation. Attempts have been made to render the rolls non-melting, as by tanning the glue with hexamethylenetetramine or equivalent. However, the tanned glue has relatively little scrap value and, further, tanned gelatine rolls have most of the disadvantages of meltable gelatine rolls except that they will stand higher temperatures.

Glue-glycerine rolls, whether tanned or untanned, have the serious defect of being very much affected by changes in weather conditions, especially changes in humidity. They become soggy (or water-logged) in wet weather and hard and non-resilient in dry weather. Further the ordinary tanned or non-melt glue-glycerine rolls have the tendency to become crumbly like art gum after a few months of use; in other words, they lose their nerve.

It is an object of this invention to provide improved printers' rollers and/or compositions for making the same. A further object is to provide compositions which do not have the defects of glue-glycerine rolls; that is, rolls, or compositions for making the same, which do not become water-logged in humid weather, do not become undesirably hard in dry weather, do not melt down in hot weather and/or under high speed operations, are tough and wear-resistant, and possess other desired properties. Another object is to provide a printers' roll which "feels right," to use the language of the printer; that is, one which is resilient, picks up ink well, and has a characteristic which could almost be described as surface tack. Corollary to the last-mentioned object, one of the purposes of our invention is to provide a composition which will retain its desired properties under widely variant conditions of the ambient atmosphere. Another object is to provide an inking roll or a printers' roll composition which will not melt in hot weather or at high speeds and yet will maintain good nerve over long periods of time, i. e. over a period of many months. A further object is to provide a new composition of matter having both high tensile strength and elasticity. These and other objects and advantages will appear from this application taken as a whole.

While difficult to put into words, rolls made according to the present invention take ink well, to use the expression of the printer, and also spread it well on the type. Another feature is that the surface properties of rolls made according to this invention seem to get better, if anything, instead of poorer at higher temperatures, thus making them very well adapted for use at high speeds and/or at high temperatures. The relatively low hygroscopicity of the rolls of this invention, as contrasted with ordinary glue-glycerine rolls, is also a salient property, as indicated by discussion presented herein above, and makes possible clean, high quality printing even under very humid atmospheric conditions. On the other hand, our composition also makes possible good printing where the surrounding atmosphere is very dry, i. e. of low humidity.

An outstanding feature of this invention involves using a product or material which for the sake of convenience and brevity may be referred to as "Ketanol," or a material of that general character (which will hereinafter be more fully defined), in combination with a protein material such as glue or the like in making our new composition of matter which is so admirably adapted for use in making inking rolls or print rolls. The composition may contain some glycerine or be free of the same. Also, along with our "Ketanol" we may employ other protein or glue plasticizers such as sorbitol, glycols, sugars or invert sugars, etc., or mixtures thereof or mixtures containing the same, with or without glycerine.

It is known that others have suggested the use of sorbitol in combination with glycerine or with diethylene glycol as a softener for glue. However the compositions of the present invention have many distinctions and advantages over such compositions, as well as over ordinary glue-glycerine rolls, due to the presence of our "Ketanol" or equivalent, as will be evident.

To quickly illustrate important differences of our compositions over those above mentioned in which glycerine alone is used and those in which sorbitol alone or only in admixture with glycerine is used, it is significant that less pounds of "Ketanol" than of glycerine are required per pound of glue or the like to plasticize the latter to a desired degree of softness, whereas more sorbitol than glycerine is required per pound of glue, gelatine or equivalent substance to attain a desired degree of softness. Also whereas "Ketanol" may be used alone (or in combination with glycerine or other softeners or plasticizers) as a modifier for glue in making printers' roll, it appears that sorbitol cannot be used except in admixture with glycerine or the like, as indicated by the last paragraph on page 1 of Patent No. 2,121,126 which issued to L. H. Harrison on June 21, 1938. Rolls made up with sorbitol as an ingredient possess, to a substantial degree, defects inherent in ordinary glue-glycerine rolls.

Exemplary of specific plasticizers contemplated by this invention are: (1) "Ketanol"; (2) "Ketanol" and glycerine; (3) "Ketanol" and sorbitol; (4) "Ketanol," sorbitol and glycerine; (5) "Ketanol" and invert sugars; etc. Also where "Ketanol" is mentioned, substitutes therefor may be employed and, likewise, where glycerine is mentioned other substitutes may be employed Where sorbitol is mentioned other hydrogenated sugars may be substituted. Invert sugars are, of course, a well-known article of commerce.

Before going further with general discussion and before illustrating specific methods of making the compositions of this invention, an illustrative method of making "Ketanol" will be given as an illustration of one suitable keto-alcohol or hydrogenated keto-alcohol intended for use in combination with a binder such as glue, gelatine, or the like, for example, for making printers' roll or inking rollers. Other suitable keto-alcohols and hydrogenated keto-alcohols, especially those of the type of polymethylol ketone, polyethylol ketone, etc. or hydrogenated products thereof, will be specified hereafter.

Mix 320 pounds of acetone with 800 pounds of a 37.5 percent aqueous solution of formaldehyde. It will be seen that this is approximately, though not exactly, one mol of acetone to two mols of formaldehyde. These reactants may be mixed together in a glass lined reactor or vessel, e. g. a Pfaudler reactor, having a cooling jacket or cooling coils. The charge is cooled to about 60° F. Then 3.2 pounds of potassium hydroxide, dissolved in an equal weight of distilled water, may be added. This raises the pH of the mixture to approximately 11.1 and the reaction between the acetone and the formaldehyde is started. The rate of flow of cooling water, which may be passed through the jacket or coils, as the case may be, is adjusted so that the temperature of the mixture rises about 8 to 10° F. in three and one-half to four and one-half hours. The reaction in normal practice is most exothermic after it has been under way about three or four hours or so and consequently the rate of flow of cooling water must be increased at such times to prevent the temperature from rising above 70° F., or thereabouts. That is, it is preferred to maintain the temperature at about 70° F. at this point. At this time the pH of the mixture will be about 11.3 but, at about this point will start to drop noticeably. The maximum temperature is ordinarily reached somewhere between four and six hours after the reaction is started. The maximum temperature is preferably not more than 78° F. The highest temperature which is at all tolerable is 132° F. at atmosphere press, but it is definitely advantageous, in a batch process as just defined, to keep the temperature at this point down below about 88° F. and preferably down to 78° F. or lower, temperatures of 75° or 72° F. being good operating temperatures at this point in a batch process as here defined.

After this temperature rise, the batch is maintained as close as possible to about 70° F. At the end of about six and one-half hours after starting, an additional 0.4 pound of potassium hydroxide dissolved in a like weight of distilled water may be added. At the end of seven to seven and one-half hours after starting there is again added a 0.4 pound increment of potassium hydroxide dissolved in a like weight of distilled water. A like increment of potassium hydroxide solution is also added at the end of about twelve to thirteen hours after starting, this being the last addition of potassium hydroxide, or equivalent catalyst, normally required.

The pH of the mixture at this stage is approximately 11.4 to 11.5. The last addition of potassium hydroxide solution, above mentioned, is sufficient to cause the desired reaction to go to such a state of completion at the end of a total reaction time of approximately 24 hours that the remaining formaldehyde content is less than 1%, assuming that the reaction temperature is continuously maintained at approximately 70° F. and not substantially less than such temperature. The pH of the mixture remains at about 11.4 to 11.5 throughout the last eleven or twelve hours of the reaction, i. e. subsequent to the last addition of potassium hydroxide solution.

At the end of the twenty-four hour reaction time the remaining alkali may be neutralized with a 50% solution of tartaric acid in water, a sufficient quantity of the tartaric acid solution being added so as to reduce the pH of the mixture to about 5.5 or 5.6, potassium acid tartrate being formed or precipitated. Other acids may be used to neutralize the alkaline material. The water (and also unreacted acetone) may then be removed from the mixture by vacuum evaporation, employing a temperature of 90 to 125° F. and a relatively high vacuum such as a vacuum of 20 or, better, 25 to 28 inches of mercury. The batch, according to this particular example, contains about 44% water, more or less, because of water present in the formaldehyde solution and water added along with the potassium hydroxide. No water, or at least no appreciable amount of water, is formed by the reaction. The vacuum evaporation is continued until the batch contains approximately 17% water, or of that order. At this point the vacuum distillation or evaporation is interrupted and hydrogen peroxide, or equivalent, is added to oxidize free formaldehyde. The hydrogen peroxide may be added as a 30% solution thereof in water and should be added in an amount 10% in excess of that theoretically required to oxidize the free formaldehyde, bearing in mind that one mol of $H_2O_2$ is required per mol of $CH_2O$. Obviously the amount of hydrogen peroxide required in any given case will depend upon the particular amount of unreacted formaldehyde which remains. While the remaining free formaldehyde, as above indicated, will ordinarily be less than 1%, when analyzed by the $AgNO_3$-KCN method, whether it is present as a relatively small or large fraction of 1% will depend upon all the specific conditions which were employed in the reaction, including total time of reaction, temperatures, pH, etc. Following the addition of the hydrogen peroxide, the temperature of the mixture is raised to 180° to 190° F. for six and one-half to seven and one-half hours or until by analysis (e. g. by the potassium cyanide method) oxidation has proceeded far enough so that formaldehyde is present in the mixture only to the extent of about 0.18% or even 0.1%, or less, which makes the product suitable for a number of uses without further reduction of aldehyde content.

Then the batch may again be subjected to vacuum evaporation, employing a relatively high vacuum such as above indicated, e. g. 25 to 28 inches of mercury until, due to the elimination or reduction in the quantity of water, the viscosity of the remaining product rises so that it is of the order of 500 centipoises at 60° C. (140° F.).

The final analysis of this product will normally show less than 0.12% of formaldehyde, and will usually show a formaldehyde content of 0.05%, 0.03%, or less. This product may contain a small amount of water, for example approximately 3 to 5% of water.

The product may then be filtered, for example in a filter press, or by use of any other suitable means, to remove any slight amount of solids or foreign matter, such as may be introduced into the mixture in small quantities as impurities and such as precipitate formed due to neutralization of alkali present at the end of the reaction.

An important and preferred condition is that the entire reaction be carried out in a non-iron apparatus, glass-lined equipment being satisfactory and being readily available. Iron in very small quantities, even in quantities as low as one part per million parts of the product just mentioned, affects the product very adversely from the point of utility thereof and causes bad discoloration of the same.

The product produced by the operation just described is illustrative of the material referred to hereinabove as "Ketanol." While "Ketanol" may and is believed by us to be composed largely, if not substantially completely, of material comprising methylol acetones or polymethylol ketones or mixtures thereof, which are preferably substantially free of formaldehyde, nevertheless the above making procedure will illustrate and identify "Ketanol" and materials comprehended by that term. The product may be and normally is (when made according to the above process) substantially water white and is of approximately the consistency of ordinary corn syrup or "Karo" and has some physical properties which are closely related to those of glycerine, for example, though it has other properties which are widely different from glycerine.

Trimethylol acetone, or at least one related compound or homologue thereof (which may be contained in "Ketanol") recognizing that different homologues of somewhat different properties exist, may be referred to as having structural formulae related to that of trimethylol acetone, which latter may be illustrated as follows:

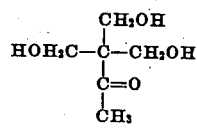

Materials having a formula of the general type of that of trimethylol acetone may be represented by the following:

where R indicates —CH₂OH, —CH₂.CH₂OH, etc. and/or H groups sufficient to satisfy three valences and where R' may indicate any of such groups sufficient to satisfy three valences and will usually, though not necessarily, be different from R.

It will be understood that the above formula of trimethylol acetone is given only by way of illustration or theory and is not to be interpreted to mean that the same is necessarily a constituent of our "Ketanol," nor that it, or a mixture of it with dimethylol acetone are necessarily a predominant constituent thereof, though they may be.

Another material which may be used according to our invention with glue, gelatine, etc., may be referred to as a methylol butanone which may be derived from methyl ethyl ketone and may have the following structural formula:

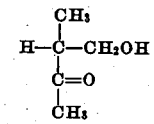

Various hydrogenated methylol ketones are also useful as plasticizers for proteins and the hydrogenated form of a methylol ketone, e. g. of the methylol butanone just mentioned, may be represented as follows:

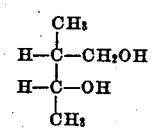

In fact the last-mentioned hydrogenated product appears to be superior to the previously mentioned material from which it may be considered to be derived.

While "Ketanol" appears to be composed largely if not substantially completely of methylol ketones such as polymethylol acetones (probably containing at least an appreciable amount of trimethylol acetone) and is substantially free of aldehydes, containing 0.05 or 0.03% or less of formaldehyde or equivalent, and possibly containing no more tahn 0.01% or being substantially completely free of aldehydes, and may be made by the above described method, it can also be made by other methods of which we are aware. For example, paraformaldehyde may be employed, in lieu of formaldehyde, as a reactant in admixture with acetone, thus eliminating or reducing the problem of removing water from the product.

A further method of making "Ketanol" or equivalent generally involves absorbing formaldehyde gas in water, fractionating and distilling methylene glycol (which is a derivative of formaldehyde) from the formaldehyde solution, the methylene glycol immediately changing into paraformaldehyde and an aqueous solution of formaldehyde. Then the paraformaldehyde mixture may be caused to react immediately with acetone in a reactor of the same type or similar to that above mentioned, e. g. a Pfaudler reactor. The water from which methylene glycol is removed by distillation is customarily used over again to dissolve further quantities of formaldehyde.

A still further method of making this product generally involves passing formaldehyde up through a bubble tower, packed tower, or equivalent, while passing acetone and alkali down through the tower. In this case the formaldehyde may be relatively free of water as compared with the 37½% formaldehyde solution described in the above procedure for making "Ketanol."

A further continuous process for making "Ketanol" involves passing a mixture of slightly more than one mol of acetone to two mols of formaldehyde through a glass tube (or a plurality of glass tubes where greater capacity is desired) which may be about 10 m. m. in diameter and is immersed in a water bath maintained at a constant temperature, e. g. 50° C. Just prior to the introduction of the continuous stream of the mixture of acetone and formaldehyde into the reacting tube, a sufficient stream of dilute KOH solution may be added so that the pH of the reactant mixture will be about 11.3. The rate of passage of reactants through the glass tube may be such that the reactants will remain in the heated reacting zone for from 3 to 10 minutes, e. g. approximately 7 minutes. The glass tube may be of any desired length but may be of the order of 150 feet. The product leaving the reacting tube may be allowed to stand in stainless steel, glass or nickel storage containers for some time, e. g. over night, thus causing a further reduction of formaldehyde, before the resulting material is further treated to purify the same, for example, as hereinabove illustrated.

The following is illustrative of a formula which has been used in making an advantageous printers' roll composition of the present invention:

Example 1

| | Parts by weight |
|---|---|
| Glue | 100 |
| Water | 20 to 40 |
| Glycerine | 80 |
| "Ketanol" | 80 |
| NaHSO$_3$ | 0.4 |

The above ingredients may be compounded, for example, in the following manner. The first three ingredients mentioned, namely the binder or glue, water and glycerine, may be cooked up together and, when the mass is smooth, then cooled to less than 170° F. The "Ketanol" and the NaHSO$_3$ (sodium bisulphite) may then be added. A water-jacketed kettle is advantageously used to control the temperature or keep it sufficiently low, though not too low, to avoid gelation during mixing and the "Ketanol" is added to the cooked glue solution rather than vice versa. The "Ketanol" may be heated to about 155° F. or less, e. g. 120° F., before mixing, having the previously cooked glue solution at 160° to 170° F., the "Ketanol" being added slowly while the glue mixture is stirred. If there should be some tendency of the mixture to string, a slower rate of addition of the "Ketanol" and/or more stirring may be employed. After the glue, water and glycerine have been cooked together to form a smooth solution, it is normally necessary to continue the cooking after starting to add the "Ketanol" for only about 10 minutes to ½ hour, more or less, as required to obtain a smooth mix. The sodium bisulphite, which may be added in admixture with the "Ketanol," may also be accompanied, if desired, by a small quantity of phenol, formanilide, urea, etc. These materials may function, to some extent at least, to keep the composition desirably soft or to retard any tendency of the glue to tan. Retardation of the tanning action of formaldehyde or the like or the maintaining of a soft composition may also be accomplished by other agents.

The resulting composition may be moulded or cast to form a printers' roll. As is well known in this branch of art, printers' rolls may vary greatly in size, depending upon the use for which they are desired, and may have an outside diameter of one inch to ten inches, more or less, and a length of one foot to ten feet, more or less. The above printers' roll composition may be forced into a hot water heated gun or mould to form the same into shape, the resulting roll, by way of illustration, possibly having a metal or steel shaft centered therein and having a cord or the like wrapped around the shaft so as to anchor the gelatine to the shaft in conventional manner.

The following illustrates a printers' roll composition containing no glycerine:

Example 2

| | Parts by weight |
|---|---|
| Water | 1 to 1½ |
| Glue | 2 |
| "Ketanol" | 4 |

The glue and water may be cooked until smooth, for example at temperatures of the order of 180 to 200° F., or so. The temperature at this stage need not necessarily be maintained within narrow limits. The mixture is then cooled to 170° F. or 160° F., or so, and the "Ketanol" is added, preferably gradually, and the same is mixed thoroughly while keeping the temperature at approximately 170° F., or of that order, for about 10 minutes to ½ hour, more or less, i. e. until a smooth, uniform and non-stringy composition is obtained.

The composition may then be subjected to vacuum evaporation, employing for example a vacuum of 25 inches of mercury and a temperature of the order of 140° to 170° F., e. g. 150° F. until one-half part or less of the water remains in the composition, e. g. one-fourth pound or less of water per pound of glue. This composition may then be cast in the usual printers' roll "gun."

The "Ketanol" used in the above formulation was modified so that it contained 10% of urea and 0.5% of sodium bisulphite.

Where the "Ketanol" employed is substantially free of aldehydes, such as formaldehyde, the printers' rolls may be used for a long period of time and thereafter have value as scrap.

Since the tanning of the glue, even where this occurs, is relatively slow, scrap produced in the course of casting the printers' roll (which is quite appreciable) may be remelted and used in subsequent batches. Such scrap is usually used up in the next batch prepared.

Other advantageous compositions of matter which have been made according to our invention are as follows:

Example 3

| | Parts by weight |
|---|---|
| Glue | 100 |
| Water | 40 |
| Sorbitol | 90 |
| "Ketanol" | 90 |

Example 4

| | Parts by weight |
|---|---|
| Glue | 100 |
| Water | 40 |
| Sorbitol | 60 |
| Glycerine | 60 |
| "Ketanol" | 60 |

*Example 5*

| | Parts by weight |
|---|---|
| Glue | 100 |
| Water | 40 |
| Propylene glycol | 72 |
| "Ketanol" | 160 |

All of these compositions have utility, for example in making printers' rolls, those of Examples 3 and 4 being preferred in a number of respects over that of Example 5. The composition of Example 4 is more resilient, at least under certain conditions, than either the composition of Example 1 or that of Example 3.

Suitable methods of compounding the ingredients of Examples 3, 4 and 5 will be evident from the illustrations given in connection with Examples 1 and 2.

Compositions such as those illustrated in any of the above formulae, when employed in making inking rolls or printers' rolls, or employed for analogous uses, carry out the objects and advantages set forth hereinabove and provide distinct and important advantages over any and all types of printers' rolls heretofore known to us.

While several of the characteristic properties of "Ketanol," as well as illustrative making procedures and chemical composition, have been discussed above, this material has other important properties and characteristics worthy of note in connection with the subject matter of this invention. It resembles glycerine quite closely in certain of its physical properties, including specific gravity, surface tension, solidification point, and refractive index. However it is not nearly as hygroscopic as glycerine and is much more effective in its plasticizing action on glue gels, particularly in achieving high tensile strength and high stretch, which are important properties in printers' rolls as well as in other articles where plasticized proteins or glues are employed. When free of water, "Ketanol" has a viscosity very much greater than that of glycerine, viz. a viscosity of about 13,000 centipoises at 30° C. as against 800 centipoises for glycerine at the same temperature, but its viscosity drops rapidly either on heating or on the addition of small quantities of water. "Ketanol" in its use in making printers' roll differs remarkably from glycerine in that much less "Ketanol" than glycerine is needed for a given amount of glue to produce a given softness of finished product of desired tensile strength; that is, "Ketanol" is much more effective than glycerine in plasticizing glue. On the other hand sorbitol (which has been suggested for use in combination with other materials in making printers' roll) is less effective even than glycerine as a plasticizer for the binder or glue and is far less effective than the "Ketanol" herein described for such purpose. This is an important consideration in view of the fact that the wearing qualities of such a printers' roll may be considered as due primarily to its content of glue or its equivalent and hence, other things being equal, it is desired to have present as high a percentage of glue, or equivalent, as possible.

To illustrate the differences and advantages of "Ketanol" as compared with glycerine as a plasticizer or modifier for glues, gelatines and the like, a number of tests were run to show comparisons between tensile strength and softness (which are important properties in various compositions, for example those used in making printers' roll) of (1) glue plasticized with glycerine; (2) glue plasticized with a 50-50 mix of glycerine and "Ketanol"; and (3) glue plasticized with "Ketanol," all under like conditions of temperature and humidity (which are important conditions to be reckoned with in the use of printers' roll).

For example, three different glue compositions were made up at the same time as follows: (1) glue plasticized solely with glycerine; (2) glue plasticized with a 50-50 mix of glycerine and "Ketanol"; and (3) glue plasticized solely with "Ketanol." The same percentage of plasticizer to glue was used in each of these three compositions. Each was sheeted out so that the test piece was like a strip of paper, being about 6 inches long, ½ inch wide and about .003 inch thick, each test piece being substantially identical with the other two. Each test piece was conditioned for 13 days at room temperature (about 70° F.) and 50% relative humidity. At the end of the 13 days each test piece was subjected to test for (1) stretch and (2) tensile strength and gave the results shown in the following table.

*Table 1*

| Plasticizer for the glue | Stretch in per cent of original length | Per cent plasticizer to glue | Tensile strength in lbs/sq. in. |
|---|---|---|---|
| Glycerine | 270 | 60 | 300 |
| 50-50 mix of glycerine and "Ketanol" | 240 | 60 | 750 |
| "Ketanol" | 80 | 60 | 1500 |

Another set of samples conditioned for 13 days at 12 percent relative humidity and room temperature, responded to test as follows:

*Table 2*

| Plasticizer for glue | Stretch in per cent of original length | Per cent plasticizer to glue | Tensile strength in lbs/sq. in. |
|---|---|---|---|
| Glycerine | 180 | 100 | 200 |
| 50-50 mix of glycerine and "Ketanol" | 180 | 100 | 700 |
| "Ketanol" | 40 | 100 | 3350 |

Two separate sets of samples were each treated for 24 hours at 140° F. and then conditioned for 13 days at 50 per cent relative humidity and room temperatures and responded to tests as shown in the following two tables.

*Table 3*

| Plasticizer for glue | Stretch in per cent of original length | Per cent plasticizer to glue | Tensile strength in lbs/sq. in. |
|---|---|---|---|
| Glycerine | 60 | 50 | 250 |
| 50-50 mix of glycerine and "Ketanol" | 75 | 50 | 1500 |
| "Ketanol" | 25 | 50 | 3500 |

*Table 4*

| Plasticizer for glue | Stretch in per cent of original length | Per cent plasticizer to glue | Tensile strength in lbs/sq. in. |
|---|---|---|---|
| Glycerine | 45 | 70 | 100 |
| 50-50 mix of glycerine and "Ketanol" | 170 | 70 | 725 |
| "Ketanol" | 70 | 70 | 1450 |

From comparisons shown in Table 4 it will be seen that the "Ketanol" plasticized glue composition showed decidedly greater stretch and, at the same time, many times as great strength as the glycerine plasticized glue composition or test piece.

In each of the above tables the percent plasticizer to glue was constant for each table. In the following table, the percent stretch is constant. The films tested were each aged 6 days at 10 to 20 percent relative humidity, then heated for 24 hours at 140° F. and conditioned for 24 hours at 10% relative humidity and room temperature.

Table 5

| Plasticizer for glue | Stretch in per cent of original length | Per cent plasticizer to glue | Tensile strength in lbs/sq. in. |
|---|---|---|---|
| Glycerine | 175 | 87 | 275 |
| 50-50 mix of glycerine and "Ketanol" | 175 | 93 | 875 |
| "Ketanol" | 175 | 137 | 1250 |
| Glycerine-tanned glue | ¹ 90 | 80 | 100 |

¹ Never over.

In the next table, where the samples tested were conditioned as those of Table 5, we compare other qualities with tensile strength constant.

Table 6

| Plasticizer for glue | Stretch in per cent of original length | Per cent plasticizer to glue | Tensile strength in lbs/sq. in. |
|---|---|---|---|
| Glycerine | 14 | 63 | 1000 |
| 50-50 mix of glycerine and "Ketanol" | 137 | 88 | 1000 |
| "Ketanol" | 235 | 145 | 1000 |
| Glycerine-tanned glue | 10 | 55 | 1000 |

The comparisons of the above tables illustrate the decided differences between glycerine alone as a plasticizer for glue and the like and "Ketanol" or mixtures containing the same. Many other equally striking comparisons have been made. However the above tests fail to show an important characteristic of "Ketanol" as distinguished, for example, from glycerine. "Ketanol"-plasticized glue ages very much better than glycerine-plasticized glues of the type used for high speed printing, but this is not illustrated by the above tables because all of the samples of the above tables were relatively new, i. e. had not been prepared but a relatively short time.

The printers' rolls or inking rolls, or plasticized protein compositions, as herein described and illustrated in the above examples take ink well and distribute ink well on the type and retain their advantageous surface characteristics through wide ranges of humidity and large changes in temperature and additionally are tough and long wearing and are free of tendency to become crumbly, like art gum, after a few months, by way of distinction in characteristics over printers' roll compositions heretofore known. In connection with the detailed procedure for making "Ketanol," given hereinabove, the following additional points may be helpful in understanding reasons for the various controls and features of the process:

(a) The reaction temperature must be kept suitably low to get desired results in a batch and ordinarily should not be allowed to go higher than about 85° F. at any time in a batch process. Higher temperatures may be used when super-atmospheric pressures are used.) One reason for this is that the reaction is so strongly exothermic that it becomes very difficult to control if the reactants are allowed to rise to higher temperatures. However, where a continuous process is employed, as hereinabove described, temperatures up to about 130° F. may be employed at atmospheric pressures.

(b) The pH must be controlled within fairly narrow limits. The reaction will not proceed at all, or at least not at any appreciable rate, unless the pH of the mixture is above about 11. A pH of about 11.2 is preferable where a temperature of approximately 70° F. is employed, as in a batch process, although a satisfactory operation may be had at this temperature where the pH is controlled between, for example, 11.1 and 11.6. In a batch process the catalyst should be added in increments (or gradually) because, even at operating temperatures such as 70° F., some alkali is apparently used up in some side reaction, such as the Cannizzaro reaction. Consequently, in order to keep the pH within desired limits, alkali must be added from time to time to compensate for this loss. On the other hand, if it were attempted to add all of the alkali needed at the beginning of a batch process, desired results would not be obtained and a dark colored product would result rather than the desired product of this invention. A pH higher than about 11.6 should be avoided even at temperatures as low or lower than 75° F., and a still lower pH is sometimes preferable if temperatures above 75° F. are employed. Where a continuous process for making "Ketanol" is employed, of course the alkaline material, e. g. KOH, is ordinarily continuously added to the stream or mixture of reactants in such amount that the reactant solution has a pH between 10.6 and 11.3, a pH of about 11.1 to 11.3 being advantageous in commercial production.

(c) At the end of the reaction the pH of the mixture should be adjusted to less than 7, and preferably between 5 and 6. This is necessary prior to heating the mixture for the removal of water and/or reaction with sodium hydroxide or equivalent, because the "Ketanol" is unstable at elevated temperatures such as used in the vacuum dehydration when under alkaline conditions. In fact at high temperatures and under strongly alkaline conditions, this product is violently reactive and forms resinous solids, which are normally highly porous, and may be employed as insulation, filler material, or the like.

(d) The acetone and formaldehyde or equivalent are mixed before adding the catalyst, e. g. the potassium hydroxide. If the alkali is added to the actone alone, bad discoloration results. On the other hand, if the alkali is added to the formaldehyde alone, this results in a disadvantageous initial reaction (possibly a Cannizzaro reaction). However, if the alkali is added to the mixture of formaldehyde and acetone under suitable conditions as herein illustrated, no discoloration results and the desired reaction proceeds. By operating according to the detailed procedure for making "Ketanol" hereinabove set forth, yields of almost 100% of "Ketanol" are attainable, yields of the order of 80% being common in the commercial operation of our invention where conditions of operation are not precisely controlled to those which are theoretically ideal. The unreacted acetone and formaldehyde account for the 20% missing from the commercial product. These unreacted materials can be recovered, especially the acetone which latter is separated from the remaining "Ketonal," for example, in the vacuum evaporation step of purification.

(e) While the catalyst, e. g. the potassium hydroxide, is described as being neutralized with an organic acid, though this is a safe and advantageous procedure, mineral acids such as hydrochloric acids may be employed while still avoiding discoloration or unfavorable consequences as a result thereof.

(f) No additional water is or need be added to the reactants (other than the water present in the formaldehyde solution and in the KOH solution) and it is desired to carry out the reaction in as concentrated a state as possible. Such water as is present is removed, when the formaldehyde and acetone are substantially completely reacted, by the use of vacuum evaporation, evaporation under a vacuum being desirable to avoid any deterioration in the quality of the "Ketanol," especially when in alkaline condition. Vacuum evaporation obviates the need for the higher temperatures required for atmospheric pressure evaporation; such higher temperatures are disadvantageous.

(g) Glass or glass-lined equipment, or equipment made of or lined with stainless steel, nickel or earthenware, or equivalent, is desired to avoid contamination by iron or certain other metals. If desired, the entire apparatus could be made of glass or other material which will not contaminate the final product.

(h) By adhering to the steps of process described above, we produce a product which is substantially free of aldehydes. Several steps in the process aid us in this. We use an excess of acetone over the theoretical one mol of acetone to two mols of formaldehyde. Any remaining formaldehyde is further reduced by oxidizing it with hydrogen peroxide or equivalent. This final aldehyde content is usually less than 0.1%. This is important in using the "Ketanol" in making printers' rolls or compositions where similar characteristics are desired because if a large amount of aldehyde, e. g. about 2 percent, were present in the "Ketanol" and the latter then used with glue in making printers' rolls, the glue would gel up almost instantaneously. On the other hand, when the product is produced as herein described (the "Ketanol" having a very low aldehyde content), it becomes possible to hold glue-Ketanol mixtures at temperatures as high as 170° F. for one or two hours or so without any appreciable tanning of the glue.

Other chemicals beside hydrogen peroxide which have been used in arriving at "Ketanol" of suitably low aldehyde content are sodium bisulphite (which forms an addition compound with aldehydes) and urea (which latter forms an insoluble precipitate with aldehydes under acid conditions) and also ethyl acetoacetic ester.

While the invention has been described and illustrated to an important degree by the use of "Ketanol" (e. g. keto-alcohols or derivatives, or methylol ketones or polymethylol acetones or the like) in combination with glue, or other high molecular weight protein, or other suitable gelatinous material, or equivalent, it will be understood that this invention is not so limited but, in addition to "Ketanol" or the like, contemplates the use of homologues thereof, or kindred compounds having hydroxy groups and similar characteristics, other keto-alcohols and hydrogenated keto-alcohols, including alkyl and/or aryl substituted compounds, e. g. hydrogenated monomethylol acetone, $CH_3.CHOH.CH_2.CH_2OH$, or 2-methyl, 1,3-butylene glycol, $$CH_3.CHOH.CHCH_3.CH_2OH$$

and the like, being particularly contemplated for the uses of this invention.

While the plasticized glue or protein compositions of this invention have been particularly illustrated in connection with their use in making printers' roller, it will be understood such compositions are broadly novel and have a number of other uses, e. g. as binder used in bookbinding, as ditto mats and the like used in ditto machines, "Hectographs," etc., and for other uses where a flexible glue or protein composition or film is desired. Also it is to be understood that, in place of making printers' rolls, or the like, entirely of glue plasticized with "Ketanol," such plasticized glue composition may simply be used as a surfacing over a base, e. g. a cylindrical base, which may, for example, be of the nature of vulcanized linseed oil or tung oil.

Where polymethylol ketones, polyethylol ketones, etc., and hydrogenation or reduction derivatives thereof are herein named as plasticizers for glue and the like, it will be understood that such materials come within the general class which may be referred to as "alkylol ketones" or "polyalkylol ketones" and reduction derivatives thereof.

The softeners or plasticizers herein described and called for, and methods of producing the same, are further defined in the copending application of Joseph H. Kugler, Howard C. Brinker, and Robert J. McCubbin, Serial No. 272,294, filed of even date herewith, now Patent No. 2,303,370.

While one method of making "Ketanol" has been described herein in considerable detail, this has been done primarily to illustrate specifically material which we use along with high molecular weight proteins or with glues or gelatines, or the like, in making compositions having utility as printers' rolls, inking rolls, or the like, as herein defined and illustrated. Our new compositions of matter are not limited to the specific compositions given, which of course are only illustrative, but contemplate all embodiments within the scope of this application and within the scope of the appended claims.

What we claim is:

1. A new composition of matter containing a binder comprising protein and a softener therefor, said softener comprising a keto-alcohol.

2. A composition for use in making printers' rollers and the like containing a protein-containing binder and a softener therefor comprising a material composed predominantly of polymethylol ketones which are fluid at ordinary room temperatures.

3. A new composition of matter containing a gelatinous protein binder and a softener therefor comprising a polyhydric alcohol and a viscous material from the group consisting of polyalkylol ketones and reduction derivatives thereof.

4. A print roll composition containing a binder comprising glue and a plasticizer therefor comprising glycerine and a ketone derivative, said ketone derivative being one in which a plurality of hydrogen atoms joined to the carbon of an alkyl group are each replaced by a $(CH_2)_nOH$ group, where "$n$" may be unity or greater, said ketone derivative being present in at least substantially as high a proportion by weight as said glycerine.

5. A new composition of matter comprising protein and a plasticizer therefor comprising an alkylol ketone composition containing at least one material from the group consisting of polymethylol ketones and hydrogenation derivatives thereof, which are fluid at ordinary room temperatures and also containing sorbitol.

6. A new composition of matter comprising protein and a plasticizer therefor comprising an alkylol ketone composition containing at least one material from the group consisting of polymethylol ketones and hydrogenation derivatives thereof, which are fluid at ordinary room temperatures, and also containing a glycol.

7. A new composition of matter comprising protain and a plasticizer therefor comprising an alkylol ketone composition containing at least one material from the group consisting of polymethylol ketones and hydrogenation derivatives thereof, which are fluid at ordinary room temperatures, and also containing invert sugars.

8. A print roll composition containing a glue-type binder and a softener therefor comprising glycerine and a polyalkylol ketone.

9. A print roll composition comprising glue, water, glycerine and a polymethylol acetone which is substantially free of aldehydes, aldehydes not being present to an extent by weight greater than 0.1 of one percent of said polymethylol acetone and said glue making up at least one-third of said print roll composition by weight.

10. A print roll composition comprising glue and a plasticizing material from the group consisting of polyalkylol ketones and reduction derivatives thereof, said material being substantially free of aldehydes, said aldehyde not being present to an extent by weight greater than 0.1 percent of said plasticizing material.

11. Composition of mattter as herein defined comprising an intimate intermixture of a high molecular weight protein and a polyalkylol ketone which is a viscous liquid at ordinary room temperature.

12. A printers' roll made as herein described comprising a substantially homogeneous composite of a gelatinous protein-bearing substance and at least one material from the group consisting of polyalkylol ketones and hydrogenation derivatives thereof which are liquids at ordinary room temperatures.

13. The process of making a print roll composition which comprises heating a mixture containing glue and water to produce a smooth mixture and, while maintaining the mix at a temperature substantially above 100° F. but sufficiently low to avoid solidification thereof, adding thereto a softener comprising a material from the group consisting of polyalkylol ketones and reduction derivatives thereof.

14. The process of making a plasticized composition which comprises cooking a mixture of a protein and water to form a smooth mix, cooling said mix to temperature below approximately 175° F. and then gradually adding thereto, while agitating the mix, a polymethylol ketone which is substantially free of aldehydes.

15. A process of making a composition of matter having utility as a print roll composition which comprises cooking together a mixture of glue, water and glycerine until a smooth, uniform mixture is obtained, said glue being present in highest proportion and said water in lowest proportion, then cooling said mixture to a temperature below about 170° F. and gradually adding thereto, while stirring, a material from the group consisting of polyalkylol ketones and reduction derivatives thereof, said material being added in quantity by weight substantially greater than that of said water and less than that of said glue.

16. The process of making a composition of matter having utility in the making of inking rolls and the like which comprises cooking together a mixture of glue and water until a smooth mass is obtained, temperatures employed during said cooking approaching but being less than the boiling point of water, then cooling said mass down at least to about 170° F. and gradually adding thereto, while stirring, a material from the group consisting of polyalkylol ketones and reduction derivatives thereof, said material not containing substantially more than approximately 0.1% of aldehyde.

17. The process of making a composition of matter having utility in the making of inking rolls and the like which comprises cooking together a mixture of glue and water until a smooth mass is obtained, temperatures employed during said cooking approaching but being less than the boiling point of water, then cooling said mass down to a temperature of the order of 160° F. and gradually adding thereto, while stirring, a keto-alcohol composed predominantly of at least one material from the group consisting of polymethylol actones and hydrogenation derivatives thereof which are liquids at ordinary room temperatures and contain not more than approximately 0.05 percent of aldehyde material, maintaining the mixture at a temperature of that order until the ingredients are thoroughly blended, and then removing water from said mixture by use of a high vacuum, water being removed until the remaining water is present in proportion less than 25% of that of said glue.

18. A printing roll composition comprising as a compatible composite a gelatinous organic binder and a softener therefor, said softener comprising an hydrogenated keto-alcohol.

19. A new composition of matter adapted for use in a printing roll, comprising as a compatible composite a gelatinous organic binder and a softener therefor, said softener comprising a ketone derivative in which at least one of the groups joined to the carbonyl carbon contains an hydroxyl group.

20. A printing roll composition comprising as a compatible composite a gelatinous organic binder and a softener therefor, said softener comprising a polymethylol actone.

JOSEPH H. KUGLER.
WILLIAM A. VIEVERING.